UNITED STATES PATENT OFFICE 2,559,234

PROCESS OF TREATING PAPER

John T. Stearn, Brooklyn, N. Y.

No Drawing. Application February 16, 1945,
Serial No. 578,361

1 Claim. (Cl. 117—155)

This invention has to do with the treatment of paper to improve its dimensional stability under changing moisture conditions without material alteration of the other properties of the paper. This is done by an improved process of forming a stable insoluble resin on the individual fibres of the paper. The particular resin is a condensation product of thiourea and formaldehyde, used either alone or with another resin such as a urea-formaldehyde resin.

In many uses of paper, and with papers of various kinds, the attainment of improved dimensional stability under changing moisture conditions is of great importance. For example, in cards used in punched card tabulating and sorting machines, exact register of the index points with the co-acting mechanism is essential. Dimensional changes of an order that are unimportant in some fields have practical significance in such cards, and improvements of dimensional stability therefore takes on corresponding importance. Again, in color printing of maps or the like, when a screen is used, very exact register is important and the improvement of dimensional stability is of like importance; also in paper templates. There are other uses of paper in which the same or a different degree of importance attaches to this property of the paper and in which it is desirable to attain a greater stability than has been possible with known techniques.

For most uses of paper, improvement of dimensional stability must involve no material alteration of the paper in respect of other properties. The paper must not be made materially heavier or brittle, must have essentially the same texture and "hand," and usually must retain those properties which are important in printing where the manner in which it takes the ink is a factor of prime importance.

The chief cause of the dimensional instability of paper (meaning a sheet or card, in ordinary parlance) is the instability of its constituent fibres which are largely composed of cellulose. Under changing moisture conditions, the fibres contain more or less moisture and swell or contract with resulting change in the dimensions of the paper. Even the seemingly slight swelling and contraction incident to atmospheric changes have effects which are material in uses such as those referred to above.

Some of the effects of moisture in the fibres of paper have been observed and efforts have been made to deal with them in relation to shrinkage of a rather gross sort, as in Newkirk Patent No. 2,315,128. The effect of moisture upon the wet strength of certain papers has also been noted and proposals have been made to counteract the effect, as in British Patents 297,463 and 502,724 and Canadian Patents 393,326 and 395,453. (See also "A review of the literature on wet strength paper," T. T. Collins, Jr., in The Paper Industry and Paper World, June 1943 at pages 263–269.) All of these have proposed one or another process of resin formation in a solution absorbed to some degree by the paper, with resulting deposit of the insoluble resin. So far as I am aware, however, there has been no resort to such processes in connection with the problem of attaining a high order of dimensional stability; and in particular, there has been no process of resin formation peculiarly adapted to the attainment of such stability and capable of practical application.

The objects of this invention are to improve the dimensional stability of paper and to attain a high order of stability; to do this by a special process of resin formation on and to some extent within the fibres of the paper; and to provide a process of that sort that is especially suited to the practical and economical accomplishment of a high order of stability.

I have discovered that certain resins produced by the condensation of thiourea and formaldehyde, used either alone or in conjunction with other resins, for example, ureaformaldehyde resins, are especially capable of attaining these objects; and I have discovered a process that is capable of forming such resins on the fibres in a way which does attain those objects. The following example illustrates this new process and yields a paper having the desired high order of dimensional stability.

The complete process as here exemplified may be divided into several stages, viz., the preparation of the solution, the aging of the solution (meaning the initial partial reaction stage in the solution), the thorough distribution of the partially reacted solution throughout the paper (as by complete absorption), the drying of the paper, and the curing or final reaction stage productive of the insoluble resin on the fibres. In practice, these several stages do not need to be separate and distinct, but for purposes of illustration and analysis they are so described here.

A stock solution is prepared containing thiourea and formaldehyde in the preferred proportion of about 1.5 mol of formaldehyde, HCHO, to 1 mol of thiourea, $(NH_2)_2CS$. While the range about 1.5 is the optimum, a ratio as high as 1.7 to about 2.0 may be used. The formaldehyde is conveniently provided by using commercially available formalin containing 40% of formaldehyde by volume (37.0 to 37.3% by weight). This solution preferably is made to have a pH value of from 4 to 6. It is allowed to age at room temperature, or slightly above, for about ten hours and preferably longer (e. g., overnight) during which time a desirable degree of reaction occurs. After 3 days no material further reaction is detected, and little change occurs after 24 hours. The solution becomes somewhat viscous but it is still liquid and does not take on what is spoken of as a gelled condition. No insoluble products should be formed in this stage, and none is formed with the pH values mentioned. This degree of reaction, approaching stability, is desirable at this stage of the process and has a relation to the success of the end objective.

Before this stock solution is used in the absorption step, it is diluted to an extent dependent on the desired ratio of resin to paper. For example, a typical solution is diluted until it contains 5.5% formalin (contributing 2.1% of HCHO, or 0.8% of reactive carbon), 3.3% thiourea and 91.2% of added water, by weight. This yields approximately 4.6% of resin expressed in terms of addition to the pulp or cellulose fibre content of the paper, based on the gain in weight determined by comparison of the weight in bone-dry condition before and after treatment. It will be seen that the sum of the percentages of formaldehyde (2.1%) and thiourea (3.3%), less the reaction water from the formaldehyde (1.3%) approximates the percentage of ultimate resin on the paper. This empirical relation holds true within practical limits for resin percentages from about 2% to 8 or 9%, which is the general range in which I prefer to work, and serves as a practical guide in fixing the concentration of the solution to be used for the absorption as here illustrated. Increased loading of the paper tends to make it brittle, and for most purposes this rules out anything above 8 or 9% of resin at most. The improvement in dimensional stability is very substantial with 2 to 5% of resin, and while I prefer to use such amounts I do not exclude somewhat smaller or larger amounts which the user may find to be appropriate to his conditions.

If desired, the solution may be prepared initially with the concentration of reactants that gives the desired quantity of resin, and such a solution may be distributed throughout the paper without the intervening step of diluting a more concentrated stock solution. The aging of the solution is the same in either case, being preferably carried to the point of practical stability at which no material further reaction occurs with additional time under the conditions described.

The absorption of the solution by the paper is accomplished by dipping or in any convenient way, followed by a nip or other squeezing action to remove excess surface water and to aid penetration. This preferably gives approximately 100% take-up as the over-all result. An immersion of 5 or 6 minutes' duration is sufficient.

Just prior to the absorption step, an acid is added to the solution, preferably phthalic acid, in such quantity as to give the solution a pH value of 2 to 3. Other acids may be used, such as boric acid, but I have found that phthalic acid is especially good in that it produces no undesirable side reactions. Oxalic, maleic or malonic acids are also desirable agents for the purpose. In the thus acidified solution, the reaction begins to proceed, but at room temperature there is no production of the desired insoluble resin during the limited time of the absorption stage. The objective at this stage is to attain thorough and uniform impregnation of all the fibres before any insoluble products are formed and to maintain the pH at a value of 2 to 3 so that the solution absorbed in each fibre will contain the proper reactants at the proper pH for the final condensation.

I have discovered that the addition of triethanolamine to this acidified solution gives a good inhibiting effect, making the solution less acid (say, pH 4 to 5) and preventing any condensation to an insoluble product, while having no deleterious effect. This addition is desirable if the solution is to be stored. Storage is feasible because at ordinary room temperatures the solution remains relatively stable. When taken from storage for use, the solution is restored to a pH of 2 to 3.

The drying and curing which complete the process are accomplished by heating the paper while it has the partially reacted solution distributed throughout it. This is done, for example, in an oven, on a drying stack or in a continuous drier. For the drying, the paper itself is preferably brought to a temperature of from 175° F. to 200° F. and is held at that temperature for from 5 to 10 minutes. The condition to be obtained, which fixes the time for any particular set of conditions, is that in which the paper is sensibly dry, but still contains soluble reaction products. The condensation to the insoluble resin is not yet complete at this stage. Traces of formaldehyde may be removed in the drying, but with the proportions given and with the exercise of the described care in the preceding steps to secure optimum reaction conditions at all the fibres, no appreciable formaldehyde is given off. It is desirable to do this drying at temperatures of the order given in order to avoid too rapid reaction, which would yield the insoluble products before proper contact with the cellulose fibres has been made. In the drying, the removal of the solvent (e. g., water) does not appreciably affect the distribution of the residual material in the paper. The reacting materials remain on or in the individual fibres so that at the final stage of complete formation of the insoluble product, it too is similarly located.

The curing is effected by continued or subsequent heating. It can proceed at the drying temperature or even lower, for example at 160° F., but that requires a relatively long time, e. g., 20 to 30 minutes or more. The preferred product is made at about 200° F. with a curing time of about 15 minutes. To expedite the curing an even more elevated temperature may be used, not exceeding about 275° F. At such a temperature the curing takes place in 1 to 2 minutes. The curing accomplishes the complete condensation to the insoluble product. No residue of soluble resin, free formaldehyde or free acid should remain at the end, and for best results the curing should be continued until this condition is attained.

To obtain best results, it is important that the distribution of the solution in the paper should be thorough and uniform, requiring care in the absorption step. The objective is to bring the solution into intimate contact with all of the fibres so that the insoluble resin will be formed on all of them. The interior fibres therefore need to be reached as well as those near the surface, and if full penetration is not obtained, leaving interior fibres poorly impregnated or untouched, the result is not good. A wetting agent may be added to the solution to promote the impregnation of the fibres but if the paper is to be used for printing, this agent should be removed or converted to a non-wetting form. It generally is preferable not to use such an agent if printing is to be done, and good distribution can be obtained without it if sufficient care is taken.

I have found that immersion for several minutes followed by a nip, as already described, is a satisfactory way of obtaining this thorough and uniform impregnation of the paper. This gives a take-up of solution equal to about 100% of the weight of the paper. A smaller total absorption may be tolerated if equivalent steps are taken to make certain that the solution is thoroughly distributed throughout the paper, meaning both laterally and in depth, and is not confined wholly or principally to the fibres at and near the surfaces of the paper or to particular lateral areas. When this condition of thorough distribution is satisfied, using a solution of the stated pH values and proportions of reactants, followed by drying and curing to the condition in which the paper is free of any appreciable quantities of soluble reaction products and of free acid or formaldehyde, then the paper so treated will have a high order of dimensional stability under changing moisture conditions, even with small contents of the thiourea resin.

The acidity of the solution should be watched in the distribution or absorption step and if there is a decrease in acidity, more acid should be added to maintain a pH of 2 to 3. This assures that the solution reaching each fibre will establish optimum conditions thereat for the further reactions in the drying and curing stage.

By this process one obtains a paper in which all of the individual fibres are well protected against moisture by an insoluble and stable resin formed on the fibres and to some extent within them. The paper sheet, regarded in gross, is not resin coated but the individual fibres are. The insoluble resin so formed appears to be thinly but thoroughly distributed over the fibres and is not lodged as discrete particles between them, so that the interstices remain. In other properties than stability, the paper is not materially changed. Its flexibility, porosity, texture and "hand" are substantially the same as before. It can take up moisture in its interstices without swelling because the individual fibres no longer are hygroscopic in any material degree, and are shielded against the effects of changing moisture conditions.

Without commitment to any hypothesis as to the reactions that take place or as to the chemical composition of the ultimate product, here spoken of as a resin, the belief is that under the conditions of this process some of the formaldehyde or its reaction products have an action upon the cellulose in addition to or joined with the formation of the thiourea-formaldehyde resin on the cellulose. No "tendering" effect on the cellulose is observed, as in other treatments of cellulose with formaldehyde, such as those that have been attempted in the textile field.

Another example of the invention is one in which a urea-formaldehyde resin or other resin is used with the thiourea-formaldehyde resin formed as here described. My preferred procedure in such a case is to prepare separate solutions for the two, the solution with thiourea being made as already described and the one with urea being made according to conventional practice for urea resins. For example, urea and formaldehyde are provided in equal weight proportions, the solution is made slightly alkaline for the initial reaction to the soluble intermediate product stage, and is made acid at the absorption stage (the pH being 5 or higher) and for the drying and curing. The paper can be treated in succession with the two solutions, carrying to the fully cured stage with one before absorbing the second solution. The thiourea resin formed by the process described here can be used with other resins as well, using appropriate conditions for the formation of the other resin. In proportions as low as about 10% to 25% of the total resin, the end result with the thiourea resin is to materially improve the dimensional stability of the paper.

Apart from the matter of dimensional stability, the resin of this invention, especially when used in combination with a urea-formaldehyde resin, has a neutralizing effect in the paper, protecting the paper against damage by such small amounts of acid as are often present in the paper. This advantage is realized as well in uses of the resin on other cellulose materials, such as textile fabrics.

The process involving the conditions here described may be used in a variety of ways in actual practice, including incorporation in the paper making process itself. It requires only the establishment of certain conditions with respect to the materials involved; and these conditions can be created by various types of equipment and along with other operations of a compatible nature.

I claim:

The process of improving the dimensional stability of paper which comprises preparing a solution of thiourea and formaldehyde in the proportion of from about 1.5 to about 2.0 mol of formaldehyde to 1 mol of thiourea, aging the said solution at a pH of about 4 to 6 to secure partial reaction without formation of insoluble products, bringing said partially reacted solution at a pH of about 2 to 3 into intimate contact with all the fibres of the paper by thorough distribution among said fibres, and heating the paper to dry it and to cause formation of an insoluble resin on the individual fibres of the paper, the heating being continued until there is no appreciable quantity of soluble reaction product, acid or formaldehyde in the paper.

JOHN T. STEARN.

REFERENCES CITED

The following references are of record in the file of this patent:

UNITED STATES PATENTS

| Number | Name | Date |
|---|---|---|
| 2,309,089 | Bauer | Jan. 26, 1943 |
| 2,325,302 | Britt | July 27, 1943 |
| 2,376,200 | Smidth | May 15, 1945 |